United States Patent
Zait et al.

(10) Patent No.: US 10,599,651 B2
(45) Date of Patent: Mar. 24, 2020

(54) DATABASE SYSTEM FEATURE MANAGEMENT

(71) Applicant: Oracle International Corporation, Redwood Shores, CA (US)

(72) Inventors: Mohamed Zait, San Jose, CA (US); Sunil Parrokkaren Chakkappen, Foster City, CA (US); Jiaqi Yan, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 561 days.

(21) Appl. No.: 15/299,418

(22) Filed: Oct. 20, 2016

(65) Prior Publication Data

US 2017/0116230 A1    Apr. 27, 2017

Related U.S. Application Data

(60) Provisional application No. 62/244,386, filed on Oct. 21, 2015, provisional application No. 62/395,524, filed on Sep. 16, 2016.

(51) Int. Cl.
*G06F 16/245*       (2019.01)
*G06F 16/2453*      (2019.01)
*G06F 16/2458*      (2019.01)

(52) U.S. Cl.
CPC ...... *G06F 16/24545* (2019.01); *G06F 16/245* (2019.01); *G06F 16/2462* (2019.01); *G06F 16/24537* (2019.01)

(58) Field of Classification Search
CPC ............. G06F 16/2454; G06F 16/2462; G06F 16/24537
See application file for complete search history.

(56) References Cited

U.S. PATENT DOCUMENTS

| | | | |
|---|---|---|---|
| 7,526,508 B2 | 4/2009 | Tan et al. | |
| 7,747,606 B2 | 6/2010 | Dageville et al. | |
| 7,984,024 B2 | 7/2011 | Bossman et al. | |
| 8,161,038 B2* | 4/2012 | Shen | G06F 16/24542 707/718 |
| 8,903,801 B2 | 12/2014 | Belknap et al. | |
| 9,244,793 B1* | 1/2016 | Brown | G06F 17/5022 |
| 9,720,941 B2 | 8/2017 | Belknap et al. | |
| 2005/0086263 A1* | 4/2005 | Ngai | G06F 16/217 |
| 2015/0339483 A1* | 11/2015 | Buschman | G06F 16/2428 707/781 |
| 2015/0363435 A1* | 12/2015 | Ott | G06F 16/212 707/803 |

* cited by examiner

*Primary Examiner* — Kris E Mackes

(74) *Attorney, Agent, or Firm* — Vista IP Law Group, LLP

(57) ABSTRACT

Systems for database system management. A method embodiment commences upon intercepting a feature or command that is issued from a software application that interfaces with a database management system. Rules are used to identify that the feature or command is of a first type (e.g., an older type). The feature or command is analyzed to determine if it is a candidate to be modified or upgraded to implement a newer feature or command of a second type (e.g., a newer type). Modifications are made to the old feature or command of the first type to implement a new feature or command of a second type. The new feature or command of the second type is sent to the database management system for processing.

20 Claims, 16 Drawing Sheets

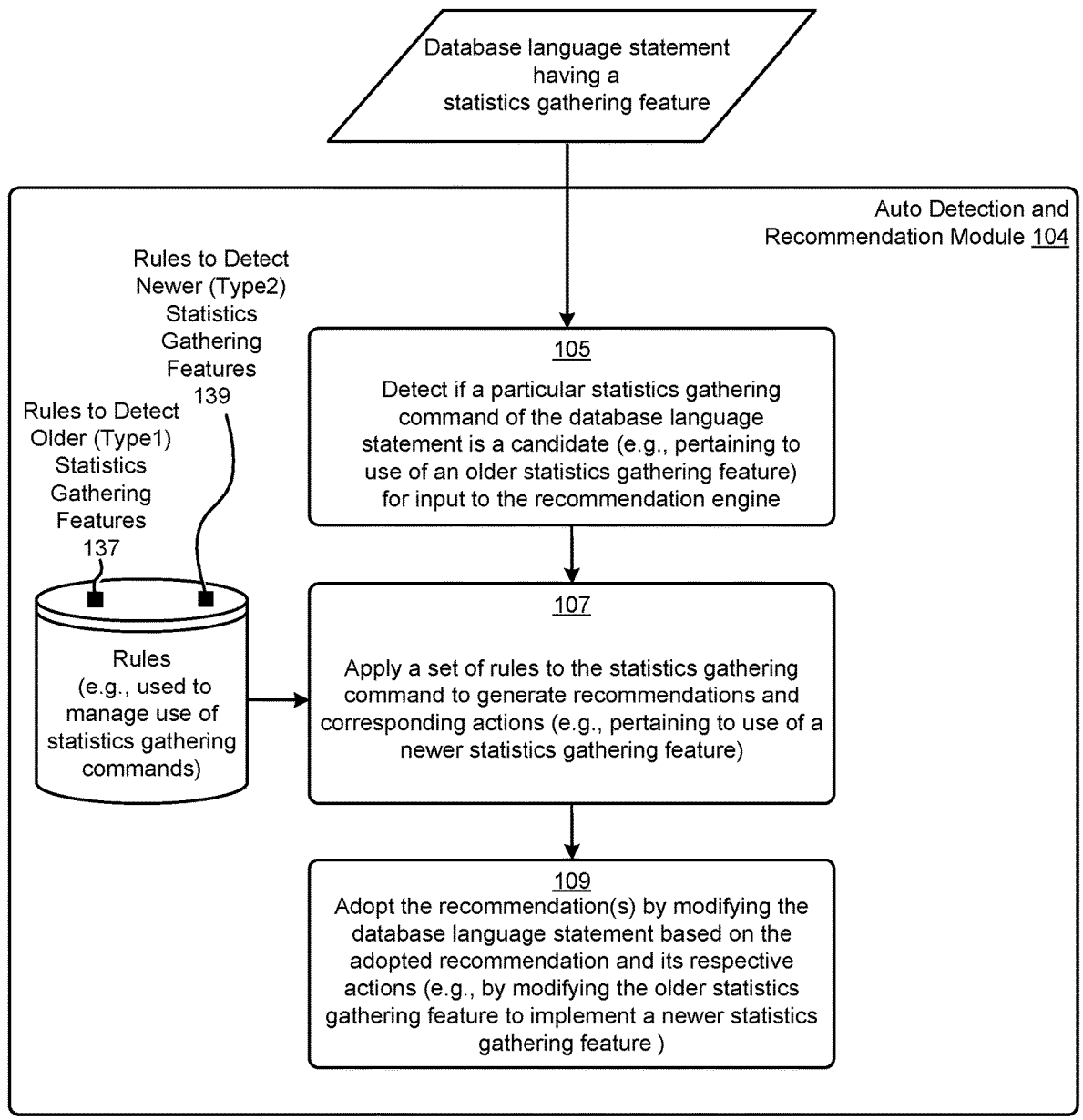
FIG. 1B1

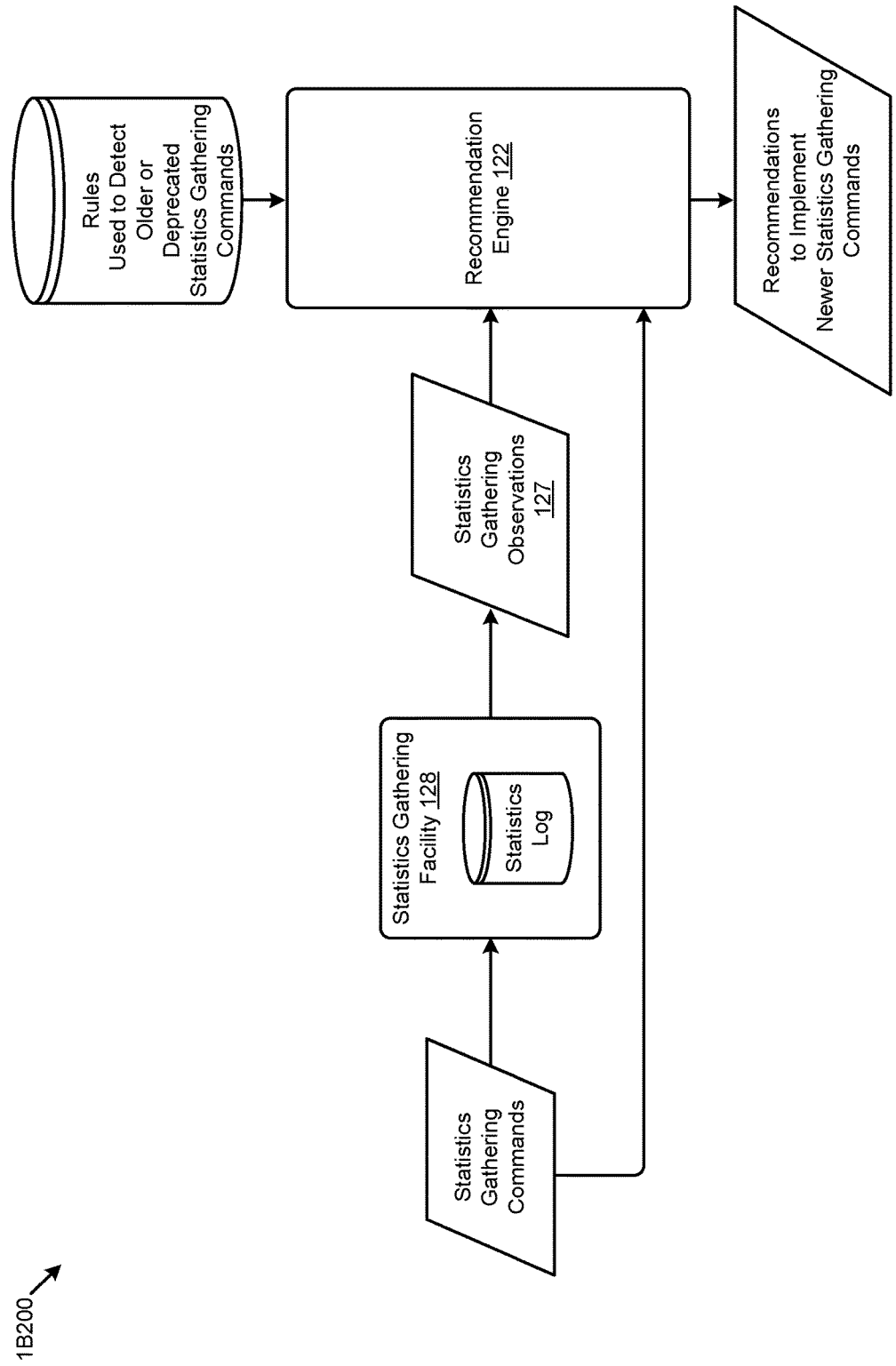
FIG. 1B2

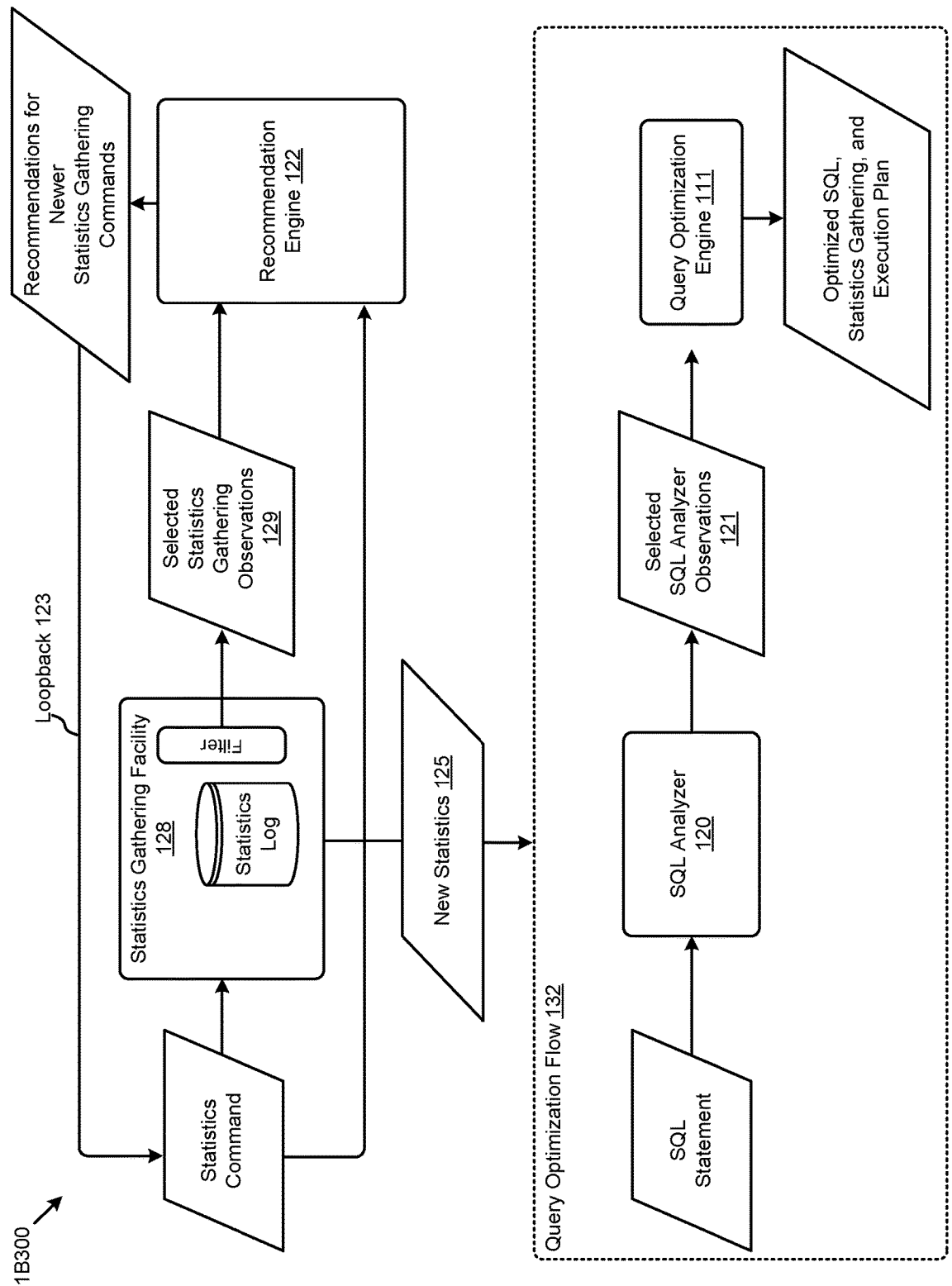
FIG. 1B3

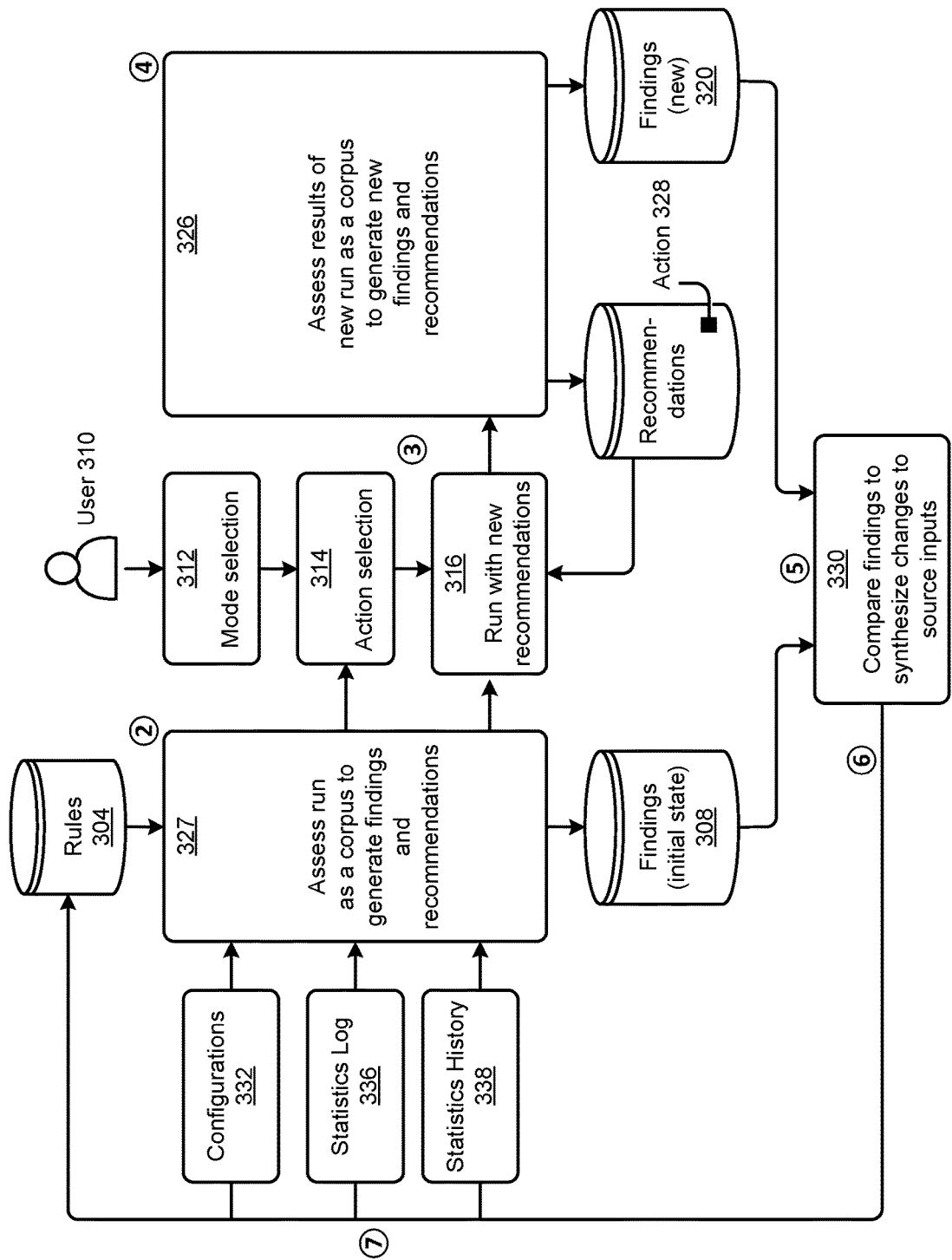
FIG. 3C1

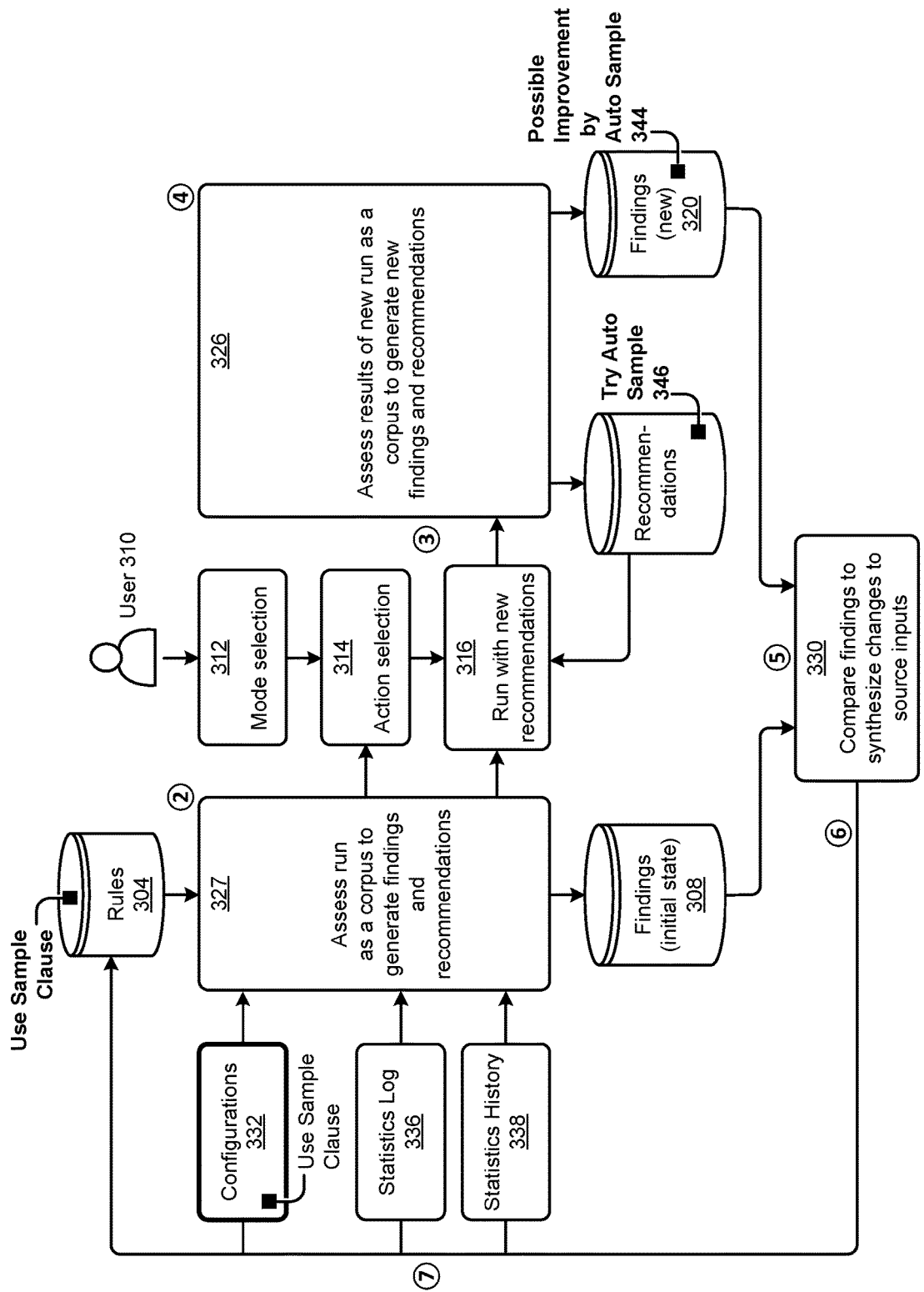
FIG. 3C2

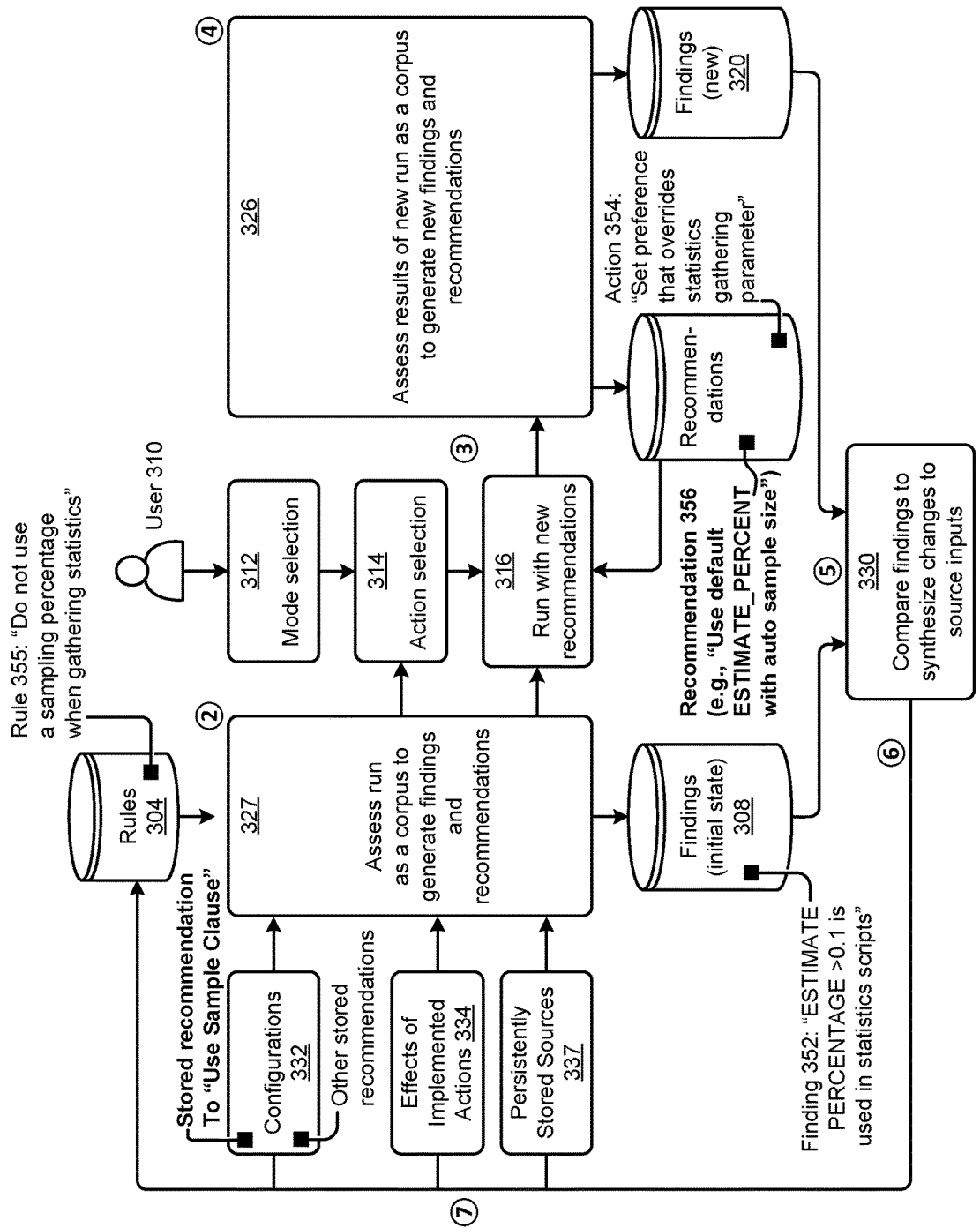
FIG. 3C3

DATABASE SYSTEM FEATURE MANAGEMENT

RELATED APPLICATIONS

This application claims the benefit of U.S. Provisional Application No. 62/244,386 titled "INTELLIGENT STATISTICS MANAGEMENT", filed Oct. 21, 2015; and this application claims the benefit of U.S. Provisional Application No. 62/395,524 titled "INTELLIGENT STATISTICS MANAGEMENT", filed Sep. 16, 2016, both of which are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to database management systems (DBMS), and more particularly to techniques for automatic overrides of database language commands.

BACKGROUND

Database statistics are often used for database query optimization. As the state-of-the art continues to advance, database systems continue to support more and more statistics gathering techniques so as to improve the ability of query optimization processes to produce better performing query execution plans. For example, in a past timeframe, some database systems began to support use of histograms to capture statistics pertaining to non-uniform data distribution. In a later release, non-sampling based statistics gathering methods were added to implementations of methods that compute the number of distinct values. In yet another release, incremental statistics gathering capabilities were added to facilitate best practices pertaining to statistics gathering over very large tables.

In some circumstances, a database system is configured to use any or all of the foregoing statistics gathering in an autonomous manner. For example, new statistics gathering processes might be automatically triggered based on how often a database object is accessed, or might be triggered based on a determination that a previously optimized plan is no longer performing optimally, or new statistics gathering might be triggered based on other performance characteristics that can be determined by the database system.

In other circumstances, software application developers and database administrators might explicitly encode then-current practices in the form of hard-coded application code or scripts. When an upgraded release of the database system is deployed, it might include upgraded statistics gathering features. If the application had explicitly encoded the older statistics gathering features into the application code base or scripts, the upgraded statistics gathering features might not be used. Having to revisit the application code and update its implementation to use the upgraded statistics gathering features is costly, which in turn makes it difficult adopt the new statistics gathering technologies.

Revising the application code to use new upgraded statistics gathering features is especially difficult when the old statistics gathering practices or statistics gathering techniques are hard-coded into the application code base. For example, in many cases, updating the application to use the new upgraded statistics gathering features requires (1) knowing/identifying that the application implements deprecated features, (2) being able to locate where the deprecated features or older best practices are encoded, and (3) having the ability to change the code. One possible approach is to hire experts to identify the source of the bad practice(s) and recommend changes to implement new statistics gathering techniques however that approach introduces several high barriers. Somebody has to recognize that there is an older statistics gathering technique and that there is a better statistics gathering solution or statistics gathering practice, then find the right experts, then be able to afford the experts, and then to be able to implement the practices into the application code base. The barriers are very high.

Worse, in many cases, users might not be aware that a problem was caused by use of older statistics gathering techniques and/or reliance on inferior statistics. What is needed are techniques that observe statistics gathering processes in the database system, automatically diagnose problems that might arise from use of the older statistics gathering methods, and then generate a report of findings and recommendations.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

FIG. 1B1 depicts an automatic detection and recommendation module as used by systems that provide automatic overrides of statistics gathering commands, according to an embodiment.

FIG. 1B2 and FIG. 1B3 depict statistics gathering use models as used by systems that provide automatic overrides of database statistics gathering commands, according to an embodiment.

FIG. 2 depicts a recommendation validation technique used by systems that provide automatic overrides of database statistics gathering commands, according to an embodiment.

FIG. 3A, FIG. 3B, FIG. 3C1, FIG. 3C2 and FIG. 3C3 depict variations of learning flows for applying automatic overrides of database statistics gathering commands, according to an embodiment.

DETAILED DESCRIPTION

Figure 1A:
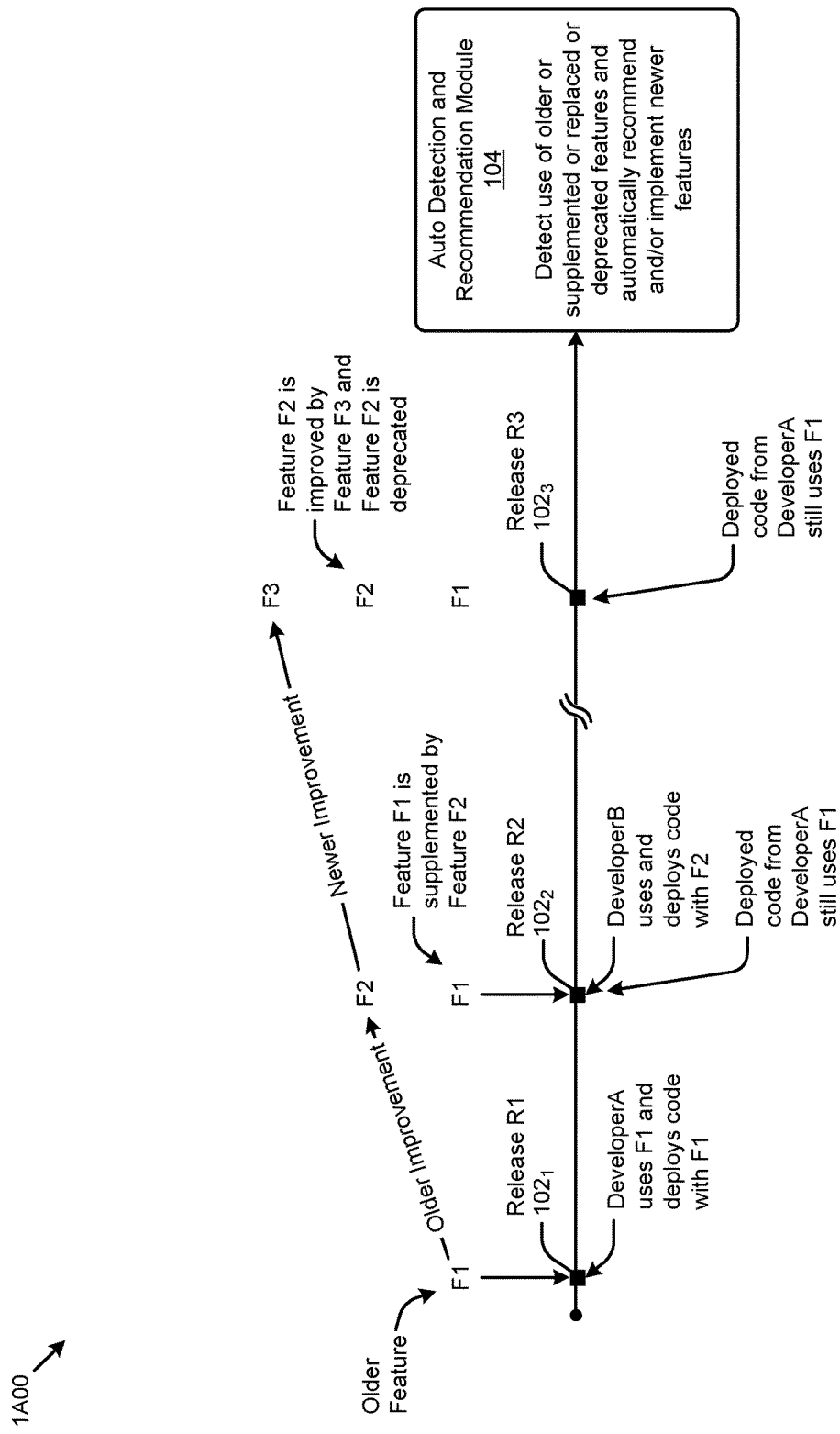
FIG. 1A depicts a feature release progression where old features can be fully or partially overridden by new features, according to an embodiment.

Some embodiments of the present disclosure address the problem of ongoing management of obsoleted or deprecated statistics gathering commands and some embodiments are directed to approaches for detecting obsoleted or deprecated statistics gathering commands and presenting recommended actions to improve performance or results of statistics gathering. The accompanying figures and discussions herein present example environments, systems, methods, and computer program products for automatic overrides of database statistics gathering commands.

Overview

A SQL optimizer examines possible plans for a SQL statement and selects the one that is predicted to have the least cost that represents resource usage and response time. In order for the optimizer to accurately determine the cost or resource usage for a particular execution plan, the optimizer needs information about the objects (table and indexes) that are accessed in the SQL statement as well as information about the system on which the SQL statement will be run. Such information is commonly referred to as optimizer statistics. Ongoing development of database technologies have implemented improved statistics gathering techniques so as to improve the ability of the query optimizer to produce better performing plans. Such ongoing development often supersedes or deprecates older or obsoleted techniques.

Software applications that interface with a database management system might use older features or older techniques that were current at the time of development, but have become superseded or deprecated in favor of newer features or techniques. The techniques disclosed herein serve to identify older techniques and replace them with newer techniques. The newer features or techniques can be ratified or adopted by a user through a user interface. Ratified or adopted newer techniques can be codified and saved so as to be applied automatically going forward. Such features can derive from any domain.

In the specific case of techniques pertaining to statistics gathering, older techniques might include rudimentary or simple statistics gather, however newer techniques might include (1) use of histograms that serve to capture non-uniform data distribution, (2) use of non-sampling based methods that serve to compute the number of distinct values more accurately and efficiently, and (3) use of incremental statistics gathering can be used for maintaining statistics for large partitioned tables efficiently.

Database system application developers and database administrators might encode then-current (e.g., current as of the time of the software application development) statistics gathering in code at the time of development. However, an upgrade of the underlying database system to a later release might include improved statistics gathering features. The formerly coded-into-the-application statistics gathering techniques might not take advantage of new techniques provided by the later release. Making changes manually (e.g., to the application code) is especially difficult when the practices are encoded in deployed application code because it requires (1) knowing/identifying the specific application that has code in it that uses superseded or deprecated behavior, (2) being able to locate where in the application the "old" (e.g., superseded or deprecated or improvable) code resides, and (3) the ability and/or knowledge of how to change the code to comport with newly-available techniques and/or practices.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions Of Example Embodiments

FIG. 1A depicts a feature release progression 1A00 where old features can be fully or partially overridden by new features and/or supplemented by new features even if implementation of new features don't necessitate removing or overriding the old feature. As an option, one or more variations of feature release progression 1A00 or any aspect thereof may be implemented in the context of the architecture and functionality of the embodiments described herein. The feature release progression 1A00 includes updates of releases to implement new features without removing or deprecating of old features.

As shown, a release (e.g., a product release) might have a release name or designation (e.g., release R1 $102_1$) and comprise a particular feature F1. At some later time, another release (e.g., release R2 $102_2$) might comprise a new feature F2 that is new as of the time of deployment of the new release R2. At the time of deployment of the later release comprising new feature F2, the earlier-release feature F1 might remain operable, even though the new feature F2 improves over feature F1 and/or supplements the operation of feature F1.

It often happens that a user or developer of a particular feature (e.g., DeveloperA) might use the particular feature (e.g., feature F1) in code that is released during the period between an earlier release and a later release. Code that is deployed using the earlier released feature might have a lifetime that spans two or more releases. In such a situation the older feature F1 exists in deployed code, yet the newer feature F2 could be used to manifest the improvements intended by the release of feature F2.

Even though a new developer (e.g., DeveloperB) might use improved feature F2 upon release of release R2, the earlier code that had been deployed and which still uses the earlier released feature F1, does not seize advantage of the benefits that accrue to use of feature F2.

The aforementioned problem (e.g., that code that uses an earlier released feature does not seize advantage of a later released feature) persists through additional releases (e.g., release R3 $102_3$) and additional features (e.g., feature F3). An auto detection and recommendation module 104 can be provided to automatically detect use of earlier released features that can be improved by use of later released features. Such detection can apply to any of a variety of features, including features pertaining to database language commands. Such detection can result in recommendations that are presented to a user. In some situations actions to implement recommendations can be taken as a result of user adoption of a recommendation. In some situations, actions to implement recommendations can be taken automatically (e.g., based on a prior user adoption of a recommendation, and/or based on observations taken from a prior implementation of an action corresponding to an adopted recommendation).

FIG. 1B1 depicts an automatic detection and recommendation module as used by systems that provide automatic overrides of statistics gathering commands. As shown at step 105, a database language statement implementing a statistics gathering feature is received by an input unit of the automatic detection and recommendation module 104. A set of rules and/or heuristics are consulted, and applicable rules are applied to the received statistics gathering command (step 107) so as to generate one or more recommendations and corresponding actions to take when a recommendation is adopted. The rules might serve to detect older versus newer statistics gathering features, and/or the rules might serve to detect older versus newer versions of language constructs, and/or the rules might serve to detect older or deprecated versions of statistics gathering commands. As shown, the rules comprise rules to detect older statistics gathering features 137 as well as rules to detect newer statistics gathering features 139. An application of a rule can have the effect of emitting actions to be taken in the event that the recommendation is adopted (step 109). For example, an action might implement a parameter override and/or a feature supplementation, and/or other modification(s) of the database language statement. A user interface is provided to facilitate user control over whether the actions are implemented automatically or whether the actions are to be taken only after user-confirmed review and adoption of the recommendations Detection and recommendations can cover a variety of database language statements. For example, detection and recommendation can apply to query optimization and/or to statistics gathering, and/or to both. In some cases a statistics gathering facility operates in parallel with a query optimization flow.

Figure 2:
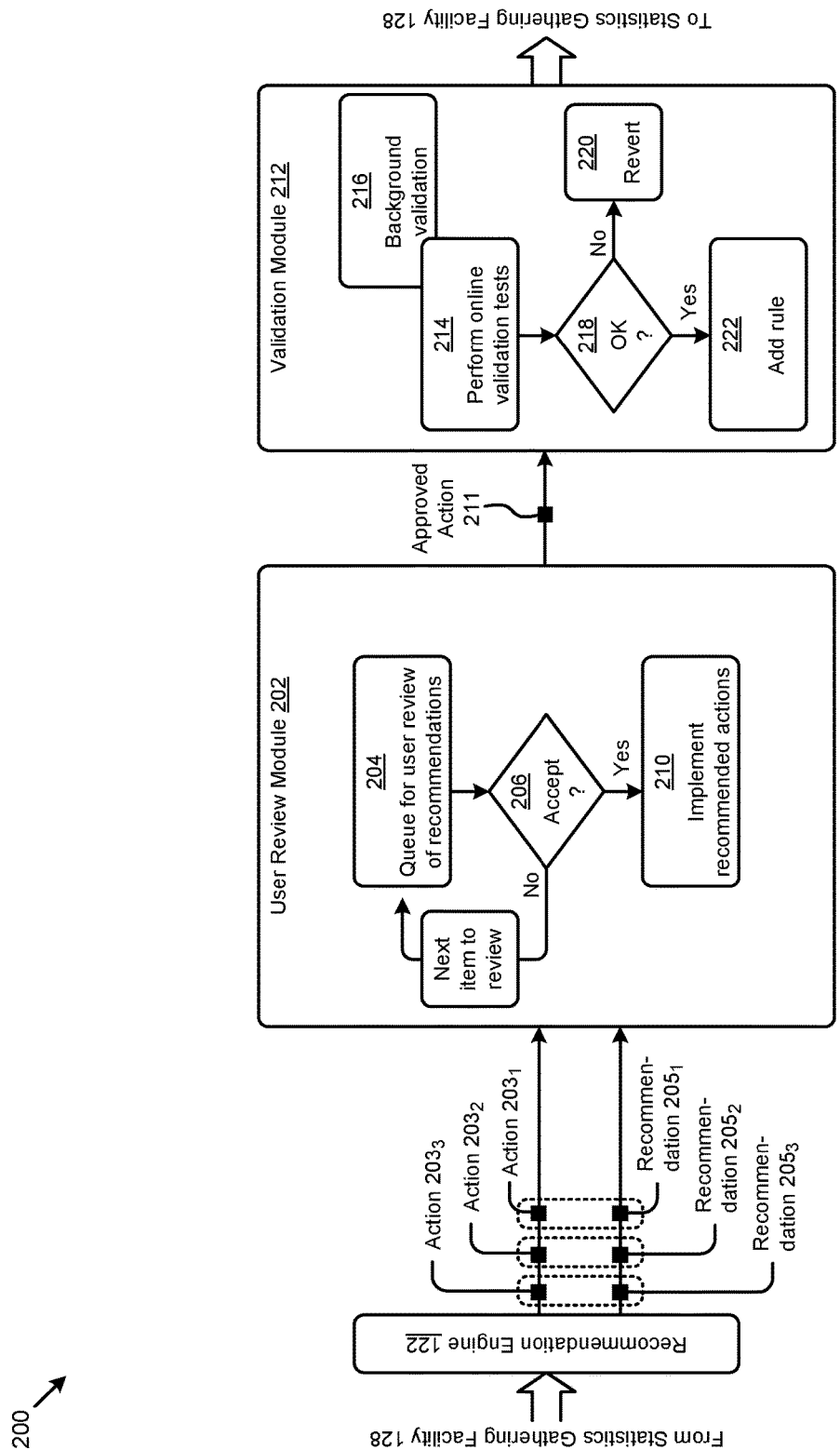

FIG. 1B2 depicts a statistics gathering use model 1B200 used by systems that provide automatic overrides of database statistics gathering commands. As an option, one or more variations of statistics gathering use model 1B200 or any aspect thereof may be implemented in the context of the architecture and functionality of the embodiments described herein. The statistics gathering use model 1B200 or any aspect thereof may be implemented in any environment.

Recommendations pertaining to use of a new database feature in lieu of an older database feature can be automatically generated. In the specific case of recommendations pertaining to use of a new statistics gathering feature in lieu of an older statistics gathering feature, a set of system observations are made, which in turn are used in the process of making recommendations pertaining to statistics gathering. As shown, a statistics gathering facility 128 receives one or more statistics gathering commands (e.g., as a clause in a SQL statement). The statistics gathering facility 128 runs the commands and reports a set of statistics gathering observations 127. The statistics gathering observations 127 are received by the shown recommendation engine 122, which recommendation engine processes the statistics gathering observations together with the statistics gathering commands and/or any clauses in a respective SQL statement. When statistics gathering command or commands are determined to be candidate for improvements using new statistics gathering commands, then a set of recommendations to implement newer statistics gathering commands are emitted.

Figure 3A:
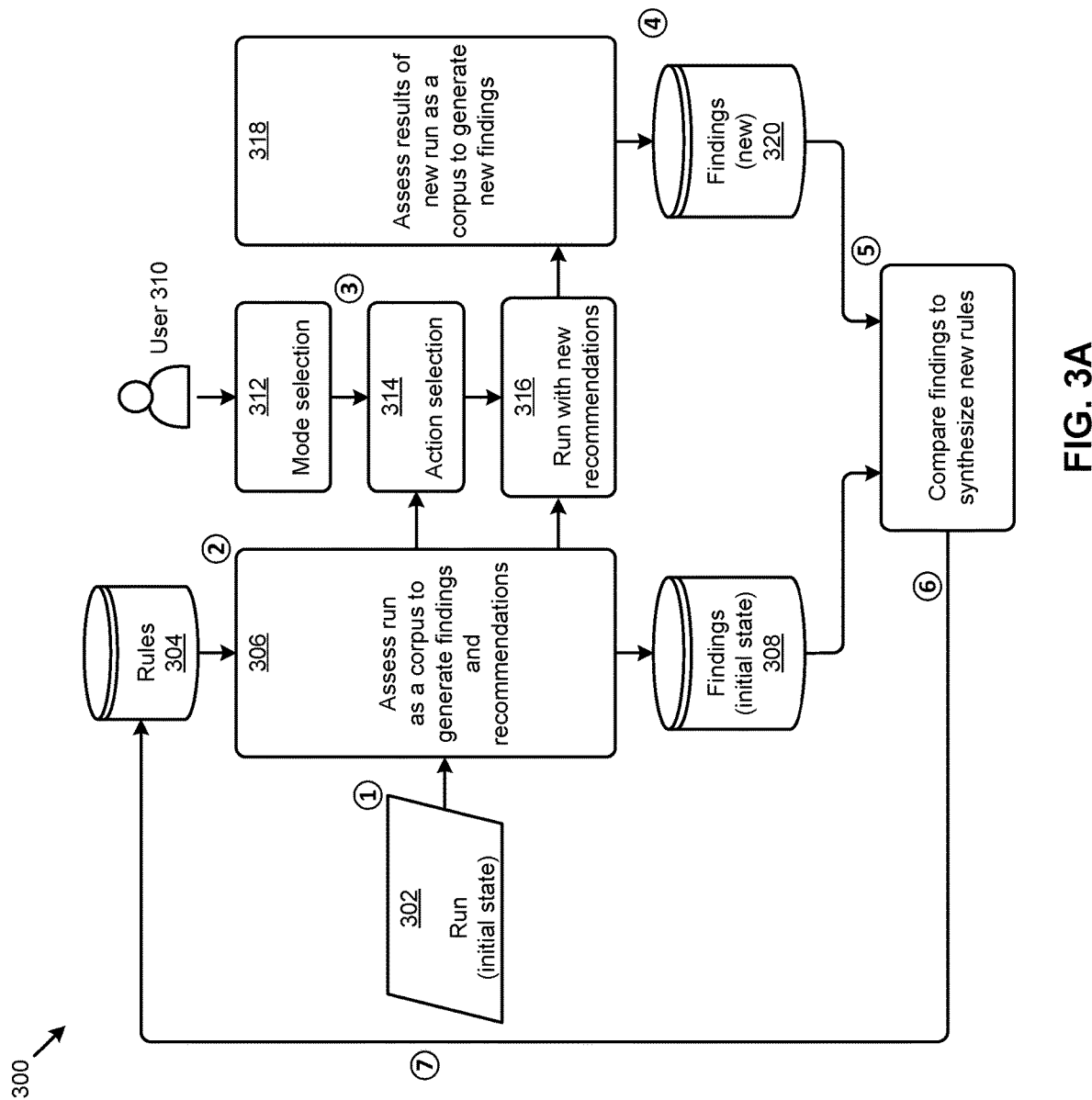

The newer statistics gathering commands emitted by the recommendation engine can be used in use models or flows that perform query optimization. One such use model is shown and discussed as pertains to FIG. 1B3.

FIG. 1B3 depicts a statistics gathering use model 1B300 used by systems that provide automatic overrides of database statistics gathering commands. As an option, one or more variations of statistics gathering use model 1B300 or any aspect thereof may be implemented in the context of the architecture and functionality of the embodiments described herein. The statistics gathering use model 1B300 or any aspect thereof may be implemented in any environment.

A statistics gathering facility 128 operates cooperatively with the shown query optimization flow. As shown the statistics gathering facility 128 includes a filter so as to emit only selected statistics gathering observations. In some cases, it can be determined (e.g., from the statistics log) that certain observations are inconsequential as pertains to making recommendations for statistics gathering command improvements. In some situations, observations made by or in response to the operation of the statistics might pertain to statistics gathering commands that are not candidates for analysis or recommendations. For example, a statistics gathering command that had not been changed (e.g., improved) in any later releases might not need to be considered as a candidate for override. Further, any observations pertaining to a statistics gathering command that had not been changed in any later releases might also not need to be considered by the recommendation engine. However, on the basis of the selected (e.g., filtered) statistics gathering observations, the recommendation engine 122 might emit recommendations to implement newer statistics gathering commands, which in turn are used in subsequent statistics gathering runs. In such cases of a subsequent statistics gathering run that adopts the recommendation(s), new statistics 125 are emitted.

The new statistics 125 (e.g., taken from statistics gathering facility 128) can be used in a query optimization flow 132. Specifically, in the context of the shown query optimization flow 132, a SQL analyzer 120 receives a SQL statement, analyzes it, and reports selected analyzer observations 121, which selected analyzer observations are used by a query optimization engine 111. In the shown use case, the SQL analyzer and the query optimization engine uses statistics emitted by the recommendation engine to produce optimized SQL, possibly including optimized statistics gathering commands and/or optimized execution plans.

This application is related to the U.S. patent application entitled "SQL TUNING SETS," with U.S. Pat. No. 7,664,778; "METHOD AND SYSTEM FOR IMPLEMENTING A SQL PROFILE," with U.S. Pat. No. 7,664,730; "GLOBAL HINTS," with U.S. Pat. No. 7,739,263; "SQL TUNING BASE," with U.S. Pat. No. 8,983,934; "AUTOMATIC LEARNING OPTIMIZER," with U.S. application Ser. No. 10/935,906, now published as U.S. Publication No. 2005/0119999; "AUTOMATIC PREVENTION OF RUN-AWAY QUERY EXECUTION," with U.S. application Ser. No. 10/936,779, now published as U.S. Publication No. 2005/0177557; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," with U.S. Pat. No. 8,825,629; "SQL STRUCTURE ANALYZER," with U.S. Pat. No. 7,634,456; "HIGH LOAD SQL DRIVEN STATISTICS COLLECTION," with U.S. application Ser. No. 10/936,427, now published as U.S. Publication No. 2005/0138015; "AUTO-TUNING SQL STATEMENTS," with U.S. Pat. No. 7,805,411; all of which are filed Sep. 7, 2004 and are incorporated herein by reference in their entirety.

The system statistics gathering can be invoked by any known method, possibly including (1) automatically invoking generation of candidate execution plans (e.g., during maintenance window), and/or (2) invoking explicitly via instructions in application code, and/or (3) invoking explicitly (e.g., via a command issued by a database administrator), and/or (4) using scripts.

In any of these cases, it is possible that statistics for a particular object can be gathered either too frequently or not frequently enough. It is possible that statistics for a particular object are being gathered using non-recommended (e.g., deprecated) options or modes. The selected statistics gathering observations 129 can be used in combination with a recommendation engine 122 to provide a mechanism to report to the DBA or any other user that certain of the practices that are being used to gather statistics might be improved by using the then-current recommended practices. The recommendation engine 122 might recommend changes to improve the performance and quality of statistics gathering and/or the recommendation engine 122 might use loopback 123 to automatically apply changes so as to improve the performance and quality of statistics gathering.

Strictly as one example, code using an earlier released feature might explicitly specify a small sample size (e.g., as a percentage) for statistics gathering so as to save on statistics gathering time. A new feature F2 uses an algorithm that greatly improves the quality of the statistics gathered without increasing the time it takes to gather such statistics. This algorithm can be explicitly triggered when users specify using a keyword AUTO_SAMPLE_SIZE instead of specifying a percentage As another example, even use of the aforementioned AUTO_SAMPLE_SIZE technique for an auto statistics-gathering job may not guarantee up-to-date statistics for all moments in time. For example, sometimes the AUTO_SAMPLE_SIZE auto gathering job does not run because some parameter combination disables it, or sometime the AUTO_SAMPLE_SIZE auto gathering job is shut down by a database administrator, or sometimes the automatic job maintenance time window is not long enough or does not have access to sufficient resources needed for statistics collection.

The recommendation engine 122 can report on any problems with statistics gathering that might potentially cause generation of bad plans. For example, the recommendation engine 122 can report on tables that have stale statistics or no statistics. The recommendation engine 122 report can also report on inconsistent statistics between a table and respective indexes on columns of the table.

According to some embodiments, the recommendation engine 122 is built on top of several components such as (1) a log of all statistics related commands or activities in the system, (2) a statistics history repository, (3) user preferences for how statistics are gathered, and (4) a set of rules that embody best practices based on a measured application workload, release identification, feature identification, etc.

Figure 1C:
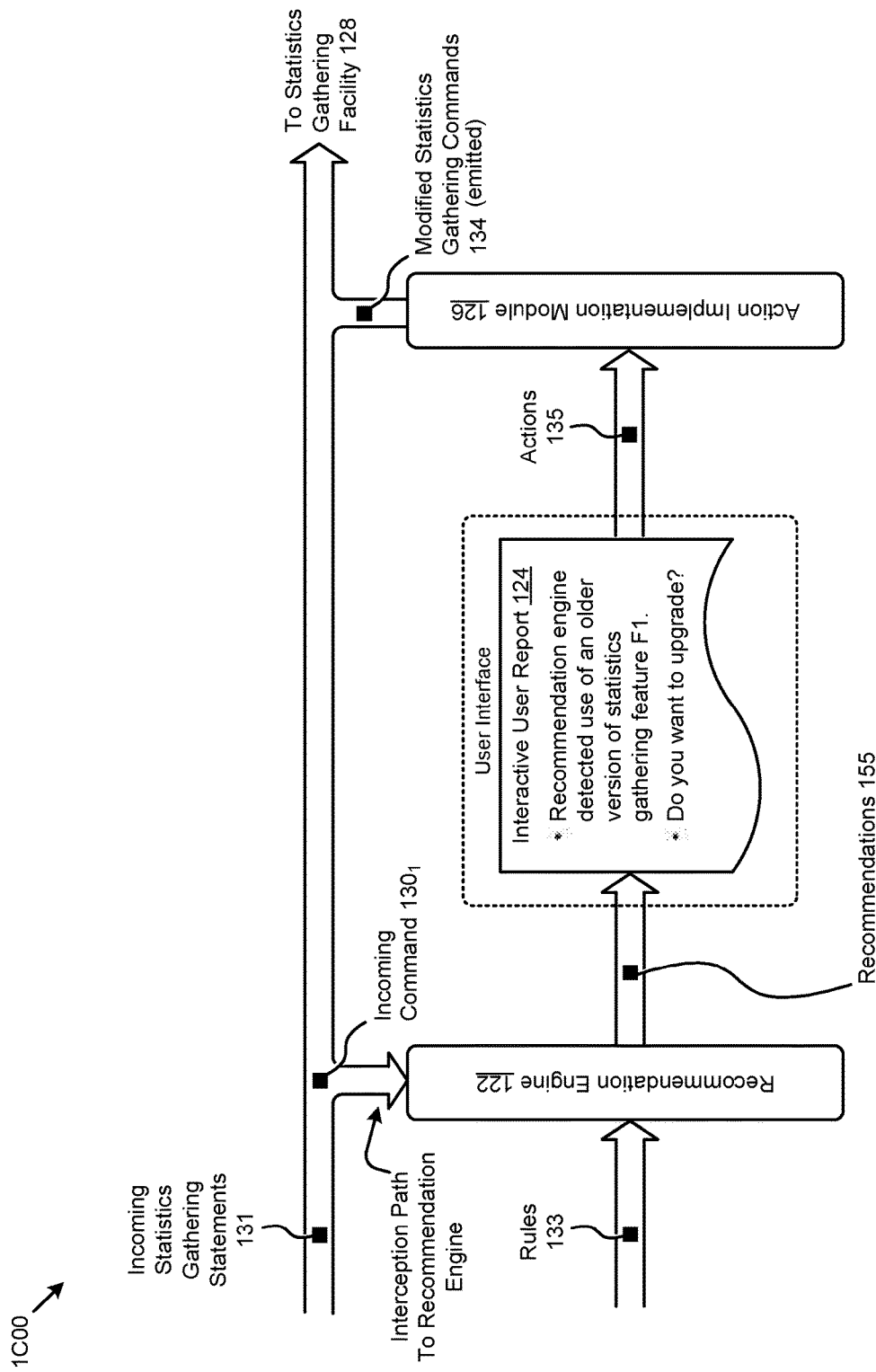
FIG. 1C depicts a command modification technique used by systems that provide automatic overrides of database statistics gathering commands, according to some embodiments.

FIG. 1C depicts a command modification technique 1C00 used by systems that provide automatic overrides of database statistics gathering commands. As an option, one or more variations of command modification technique 1C00 or any aspect thereof may be implemented in the context of the architecture and functionality of the embodiments described herein. The command modification technique 1C00 or any aspect thereof may be implemented in any environment.

According embodiments such as those that implement the aforementioned command modification technique 1C00, the recommendation engine 122 uses all or any portions of the information available to it (e.g., rules 133, incoming statistics gathering statements 131, etc.) and generates an interactive user report 124, which in turn comprises a set of recommendations 155 that are intended to improve system and application performance.

As shown, a recommendation engine processes commands found in intercepted incoming SQL statements (e.g., incoming command $130_1$) and passes occurrences of recommendations 155 to a user interface, which may in turn forward specific instances of actions 135 as well as unmodified incoming commands to an action implementation module 126. Steps taken by the action implementation module 126 can serve to implement commands with improved statistics gathering features. In some cases the action implementation module 126 emits one or more modified statistics gathering commands 134 so as to apply overrides to commands.

Recommendations can be associated with specific command modification candidates. Modification candidates can further include actions that can implement a recommendation in whole or in part by applying one or more aspects of a modification candidate to a command. Additionally, a recommendation can be associated with one or more candidate actions where the effect of taking such actions can be triggered and/or applied either automatically, or based on user guidance. As an example, a user report might include interactions with a user such that a user might be asked questions such as, "Do you want to upgrade from feature F1 to feature F2?" An action or set of actions (e.g., to upgrade or override from feature F1 to feature F2) can be taken after the user reviews the action or set of actions and accepts all or a portion of the recommendations. Recommendation and action validation techniques are shown and described as pertains to FIG. 2.

FIG. 2 depicts a recommendation validation technique 200 used by systems that provide automatic overrides of database statistics gathering commands. As an option, one or more variations of recommendation validation technique 200 or any aspect thereof may be implemented in the context of the architecture and functionality of the embodiments described herein. The recommendation validation technique 200 or any aspect thereof may be implemented in any environment.

The shown embodiment includes a user review module 202 that supports multiple use models and/or multiple modes. In an automatic mode, incoming data from the statistics gathering facility 128 goes to the recommendation engine 122, which then generates recommendations (e.g., recommendation $205_1$, recommendation $205_2$, and recommendation $205_3$) along with a respective action or set of actions (e.g., action $203_1$, action $203_2$, and action $203_3$) that are adopted automatically, and/or reported such that a database administrator can review and choose to accept or reject the recommendation and respective actions. In a manual mode, a database administrator can run a module within the recommendation engine at any time so as to review and implement at a time selected by the database administrator.

In the example embodiment of FIG. 2, the user review module 202 can include logic based on a mode selection, which logic can steer a recommendation to a process (e.g., see operation 210) to automatically apply the recommended actions, or to send the recommendation to a queue 204 so as to hold a decision pending user review. At some moment in time, the DBA might choose to accept a recommendation (e.g., see decision 206), which acceptance can be steered to a process that automatically implements the recommended actions (e.g., operation 210).

When an action becomes an approved action 211, the approved action might be delivered to a validation module 212. Various embodiments of such a validation module can perform online validation tests (e.g., see operation 214) and/or can perform validation tests using background validation (e.g., see operation 216). When a test or series of tests is deemed to be "OK", then steps are taken so as to add a new "validated" rule to a rulebase (e.g., see the "YES" branch of decision 218 and operation 222). When a test or series of tests is deemed not to be "OK", then the approved action is not implemented and changes (if any) are reverted (e.g., see the "NO" branch of decision 218 and operation 220).

In any of the aforementioned modes, implementation of the actions does not require any application or other code changes. Actions (e.g., overrides) can be applied on a case-by-case basis. In some implementations any of the aforementioned validation steps can be carried out autonomously, possibly being invoked and run over the approved action based on one or more rules. Any particular override action can be automatically rejected (e.g., when validation reveals issues) or can be automatically accepted (e.g., when validation does not reveal any issues).

A default set of rules can be modified and/or extended with additional user rules and/or user preferences. Any approved and validated action can be accessed by a statistics gathering facility 128. The approved and validated action influence the operation of the statistics gathering facility. Strictly as examples, implementation of approved and validated actions can influence the quality of statistics already gathered. In another case, implementation of approved and validated actions can cause the statistics gathering facility to perform more (or less) frequently. Implementation of approved and validated actions can cause the recommendation engine to perform its functions more (or less) frequently. As examples, the recommendation engine can be influenced to more (or less) frequently generate reports of the findings and recommendations and/or the recommendation engine can be influenced to more (or less) frequently compare findings and recommendations between time periods so as to produce a "diff report". The "diff report" can be used to highlight the measured effects of actions taken. Any of the functions of the recommendation engine can be launched manually at any given moment in time.

FIG. 3A, FIG. 3B, FIG. 3C1, FIG. 3C2 and FIG. 3C3 depict variations of learning flows 300 for applying automatic overrides of database statistics gathering commands. As an option, one or more variations of learning flows 300 or any aspect thereof may be implemented in the context of the architecture and functionality of the embodiments described herein. The learning flows 300 or any aspect thereof may be implemented in any environment.

The embodiments shown in FIG. 3A, FIG. 3B, FIG. 3C1, FIG. 3C2 and FIG. 3C3 are merely examples of learning flows. As shown, an initial state of a system (e.g., see initial state 302) is provided as input to initial findings module 306 that serves to assess the initial state so as to produce initial state findings 308 (see step 1). The assessment (see step 2) might use a rulebase 304. Strictly as one example, a rule might specify a check or test and a result, as in "If feature F1 is being used, then emit a feature upgrade recommendation to upgrade feature F1 with feature F2" (see step 2). Any actions associated with recommendations can be selected (see operation 314), possibly based on a mode selection (see operation 312) and/or in conjunction with input from user 310 (see step 3). The system is run (see operation 316), and a new findings module 318 serves to assess results of the new run (e.g., see module 326) so as to produce and emit new findings 320 (see step 4). A comparison module compares findings between the initial state findings 308 and the new findings 320 (see step 5). New rules (if any) are synthesized (see step 5) and provided in a feedback loop (see step 6) that is routed to various components of the system, possibly including the rules database (see step 7).

Figure 3B:
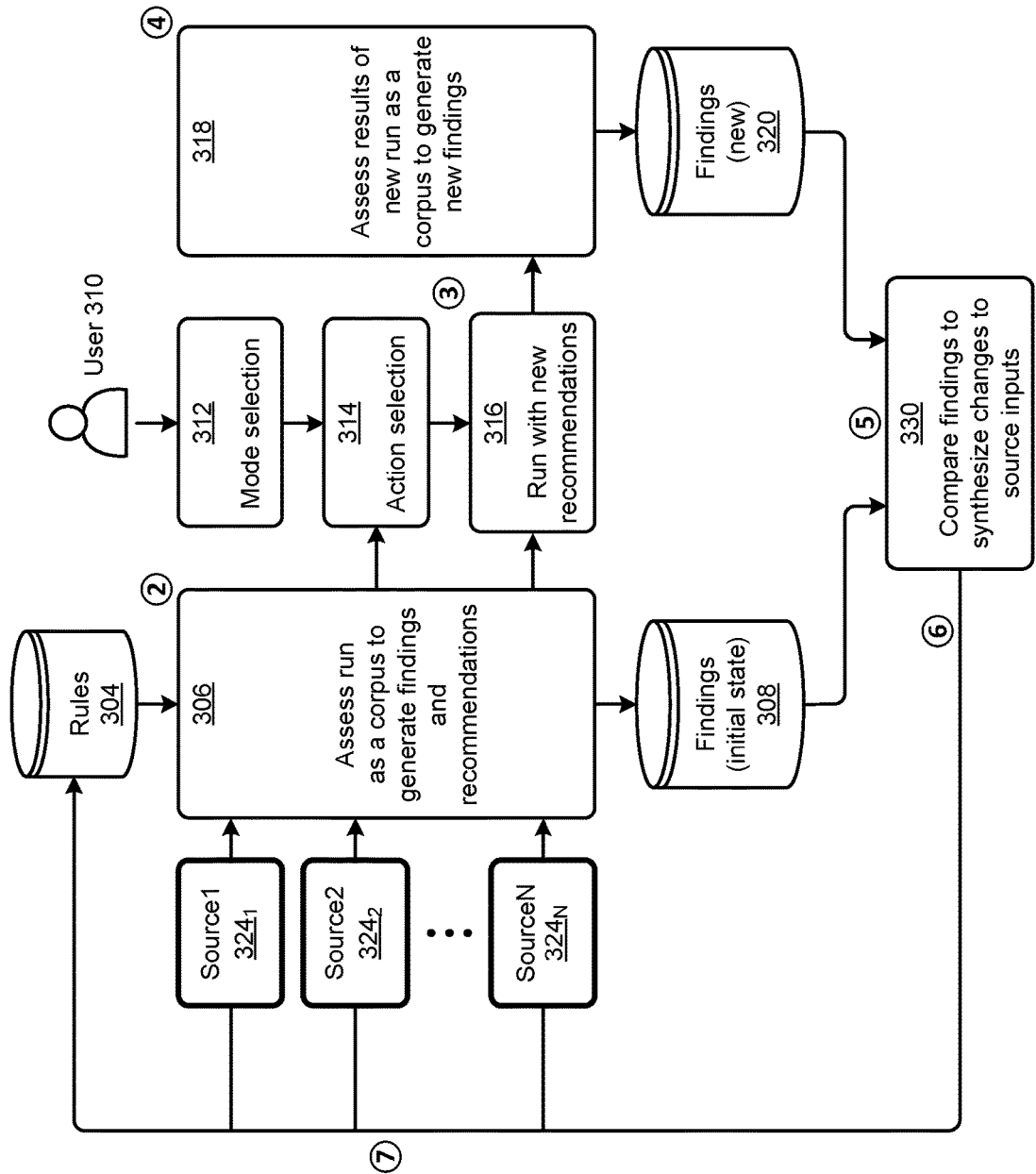

The initial state 302 can be codified into a plurality of sources. FIG. 3B depicts several sources (e.g., source1 $324_1$, source2 $324_2$, sourceN $324_N$), which in turn can receive and/or interpret changes, as shown. The changes can derive from comparison module. The changes can be stored (e.g., applied to relevant sources) on an ongoing basis such that the system "learns" over time. For example, if a comparison and synthesize module 330 determines (e.g., from comparisons over new findings) that the performance of a run is measurably improved after adopting one or more of the actions (e.g., see operation 316 and action selection aspects of operation 314), then the adopted actions might be applied persistently into one or more sources. A specific set of actions over a specific set of sources is shown and discussed as pertains to FIG. 3C1.

As shown in FIG. 3C1, the aforementioned sources might be composed of configurations (e.g., configurations for statistics gathering), and/or a statistics log 336 and/or statistics history 338, and or all of which can serve as inputs to the module 327. The shown module 326 is augmented with respect to the new findings module 318 to include the capability to emit recommendations and respective actions (e.g., action 328) that can be used in the learning process. Strictly as one example, if comparison and synthesize module 330 determines (e.g., from comparisons of initial state findings over new findings) that the performance of a run is measurably improved after adopting, for example, a recommended parameter override of a configuration parameter, then the adopted changed configuration parameter might be applied persistently into the configuration source 332. An action might have a fine degree of granularity and/or specificity. As examples, action 328 might comprise specific values (e.g., a sampling percentage values), or might comprise a data description language (DDL) statement or clause, or might comprise one or more override statements, etc. Strictly as examples, a statistics gathering command might be automatically modified or newly generated so as to automatically gather statistics for a table when the previously generated statistics are deemed to be "stale". As another example, an action might be taken to set a preference for gathering statistics using a new feature pertaining to an updated application programming interface call rather than using an older (e.g., possibly deprecated) application programming interface.

A still further example is shown and discussed as pertains to FIG. 3C2. Specifically, if comparison and synthesize module 330 determines (e.g., from parsing of the new finding "Possible Improvement by Auto Sample" 344) that the performance of a run might be measurably improved through use of auto-sampling (e.g., see recommendation to "Try Auto Sample" 346), then the adopted recommendation might be applied persistently into the configuration source 332 (e.g., see persistently stored recommendation shown as "Use Sample Clause"). In this example, the action comprises a data description language statement pertaining to auto-sampling. As shown, recommendations can be processed during step 5 and step 6.

FIG. 3C3 depicts a scenario where a particular recommendation is tagged for inclusion in a repository of learned behaviors. Using adopted recommendations and stored values pertaining to effects of implemented actions 334 and/or other instances of persistently stored sources 337, the performance of the system can be continuously improved. The configuration of FIG. 3C3 is merely one example that combines the utility of (1) rules, such as statistics management rules that describe best practices to manage statistics (see rulebase 304); (2) findings, such as observations or hypotheses of violations of the rules; (3) recommendations, such as solutions to the violations; and (4) actions, that provide ways to implement the recommendations. Referring again to FIG. 3C3, a rule 355 might be codified to carry the semantics of, "Do not use a sampling percentage when gathering statistics". When the system is observed however, a finding 352 "ESTIMATE PERCENTAGE>0.1 is used in statistics scripts" might be emitted. A specific recommendation 356 such as "Use default ESTIMATE_PERCENT— auto sample size" might be emitted, and a specific action 354 to "Set preference that overrides the parameter and gather statistics" can be stored and/or implemented for a subsequent run.

TABLE 1

Examples of findings

| Ref | Information |
|---|---|
| 1 | Statistics for Table T are "stale" |
| 2 | Statistics gathering procedures use non-default parameters. |
| 3 | Statistics for table T is gathered too frequently. |

TABLE 2

Examples of recommendations and actions

| Ref | Information |
|---|---|
| 1 | Set incremental to TRUE for Table T |
| 2 | Set the value of parameter estimate_percent to DBMS_STATS.AUTO_SAMPLE_SIZE for statistics gathering procedures. Recommendation Rationale: Setting non-default values for preference estimate_percent to 0.001 can cause inaccurate statistics. |
| 3 | Use Exec dbms_stats.gather_table_stats('sh','sales'); |

Figure 4:
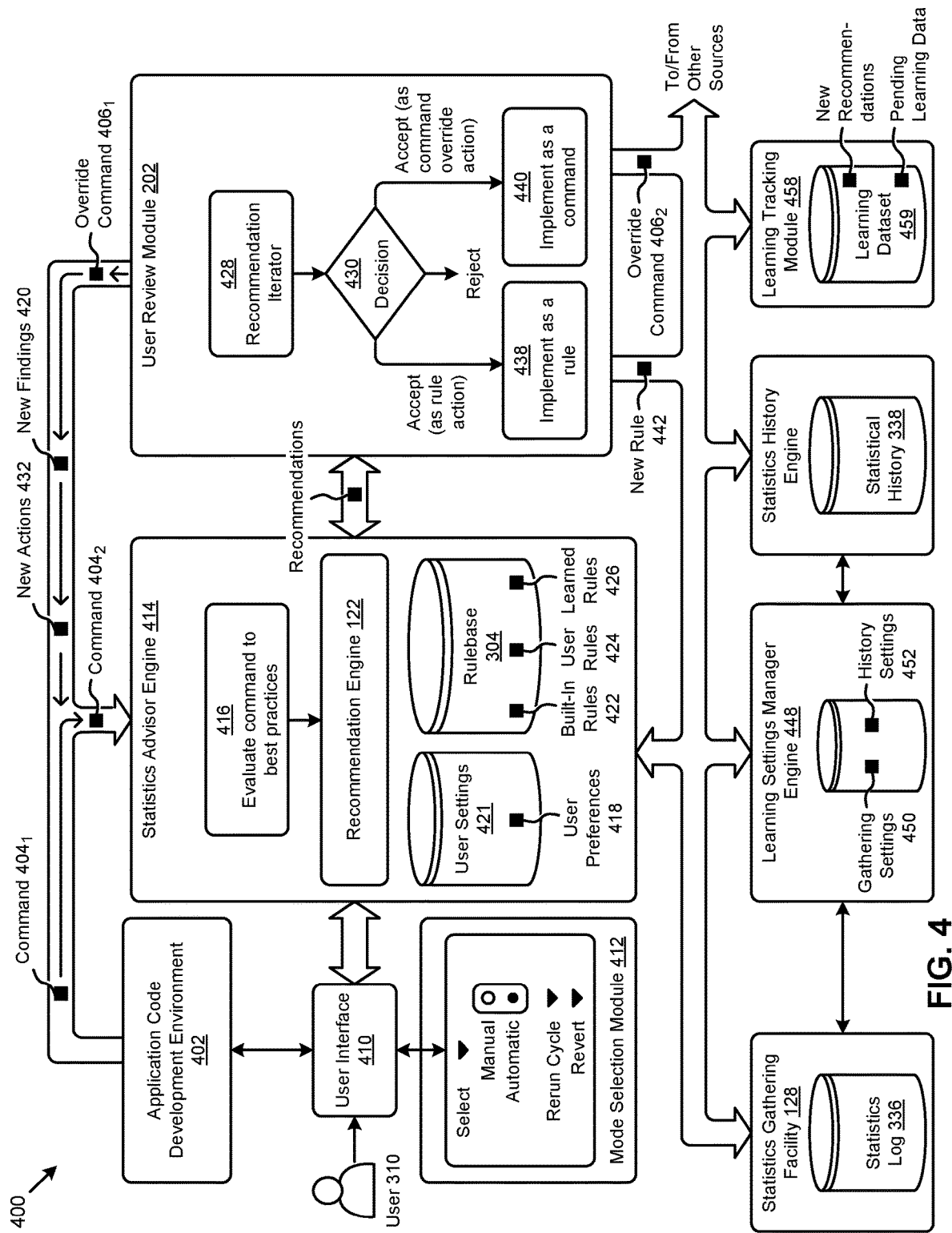
FIG. 4 depicts a machine learning system that learns from ongoing application of overrides of database statistics gathering commands, according to some embodiments.

FIG. 4 depicts a machine learning system 400 that learns from ongoing application of overrides of database statistics gathering commands. As an option, one or more variations of machine learning system 400 or any aspect thereof may be implemented in the context of the architecture and functionality of the embodiments described herein. The machine learning system 400 or any aspect thereof may be implemented in any environment.

The shown learning system includes a statistics advisor engine 414 that interfaces with a user 310 (e.g., through a user interface 410) and a user review module 202. The statistics advisor engine receives statistics gathering commands (e.g., command $404_1$ command $404_2$), and issues advice by evaluating the commands against best practices (see module 416) and running a recommendation engine 122. Recommendations are sent to the user review module 202. When a recommendation is accepted by a user, it is implemented by a respective action or set of actions. Strictly as examples, an action or actions taken based on an adopted recommendation can include changing parameters, and/or changing preferences, and/or, as shown, by implementing an override command (e.g., override command $406_1$, override command $406_2$) and/or by capturing a modified or new rule 442, or any combination thereof. The determination as to whether to accept or reject a recommendation and its actions can be made within the user review module (see decision 430).

In the case of a recommendation being taken in a manner that generates a new rule or a modification to an existing rule, the module 438 can implement the recommendation as a new rule 442. The new rule or modified rule can be propagated to a repository of rules, which in turn can comprise pre-populated rules (e.g., built-in rules 422), user-defined rules (e.g., user rules 424), as well as new rules (e.g., learned rules 426).

In the case of a recommendation being taken in a manner that results in a modification to an override command (e.g., override command 406₁, override command 406₂). The module 440 can provide the overridden command to a statistics gathering facility 128. In some cases, a plurality of recommendations are sent to the user review module 202 and each individual one of the plurality of recommendations can be processed iteratively (e.g., one-by-one) by a recommendation iterator 428.

The aforementioned decision 430 might be based solely on user input, or might be based only partially on user input. For example, a user might interact with a mode selection module 412 to make a selection of either a manual mode or an automatic mode. The user selection of a particular mode is saved to a repository of user settings 421 (e.g., in the form of a user preference 418), which in turn serve to influence the operation of decision 430. The outputs of user review module 202 can include findings, and/or recommendations, and/or actions, and/or rules, and/or command overrides (e.g., new actions 432, new findings 420, new rules 442, etc.). In some cases, override commands (e.g., override command 406₁, override command 406₂) are delivered to an application code development environment 402. The user 310 of the user interface 410 and the mode selection module 412 might be the same person. The outputs of a user review module that are delivered to a user of the application code development environment 402 can be used to inform the user of recommended ways to implement best practices.

When decision 430 results in a rejection of the recommendation the recommendation and any associated data items can nevertheless be preserved by a learning tracking module 458, which may comprise a learning dataset 459, possibly including a repository of pending learning data and/or new recommendations.

Any of the outputs from the user review module might be made accessible to the statistics gathering facility, possibly in the form of gathering settings 450, history settings 452 and/or other settings or preferences. Any combinations of gathering settings, history settings, or other settings or preferences can be managed by a learning settings manager engine 448.

Figure 5:
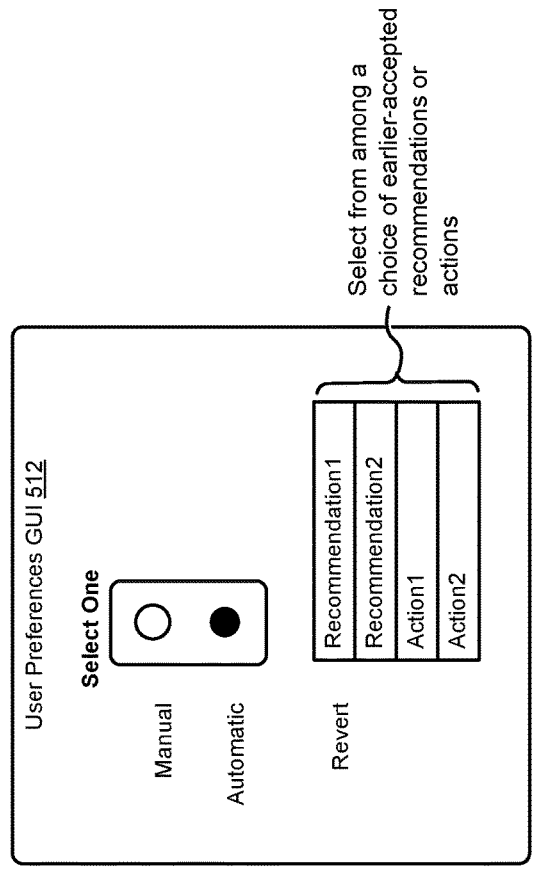
FIG. 5 depicts a management interface for configuring systems that perform automatic overrides of database statistics gathering commands, according to some embodiments.

FIG. 5 depicts a management interface 500 for configuring systems that perform automatic overrides of database statistics gathering commands. As an option, one or more variations of management interface 500 or any aspect thereof may be implemented in the context of the architecture and functionality of the embodiments described herein. The management interface 500 or any aspect thereof may be implemented in any environment.

The embodiment shown in FIG. 5 is merely one example of a graphical user interface (GUI) used to determine user preferences. As shown, the user preferences GUI 512 includes a set of radio buttons to select a user preference pertaining to a manual mode or an automatic mode. As earlier indicated, an earlier determined acceptance of a recommendation can be reverted at any time by a user. In this example GUI, a revert widget is presented as a pulldown menu that is populated with recommendations and/or actions that can be reversed by a revert operation.

Figure 6:
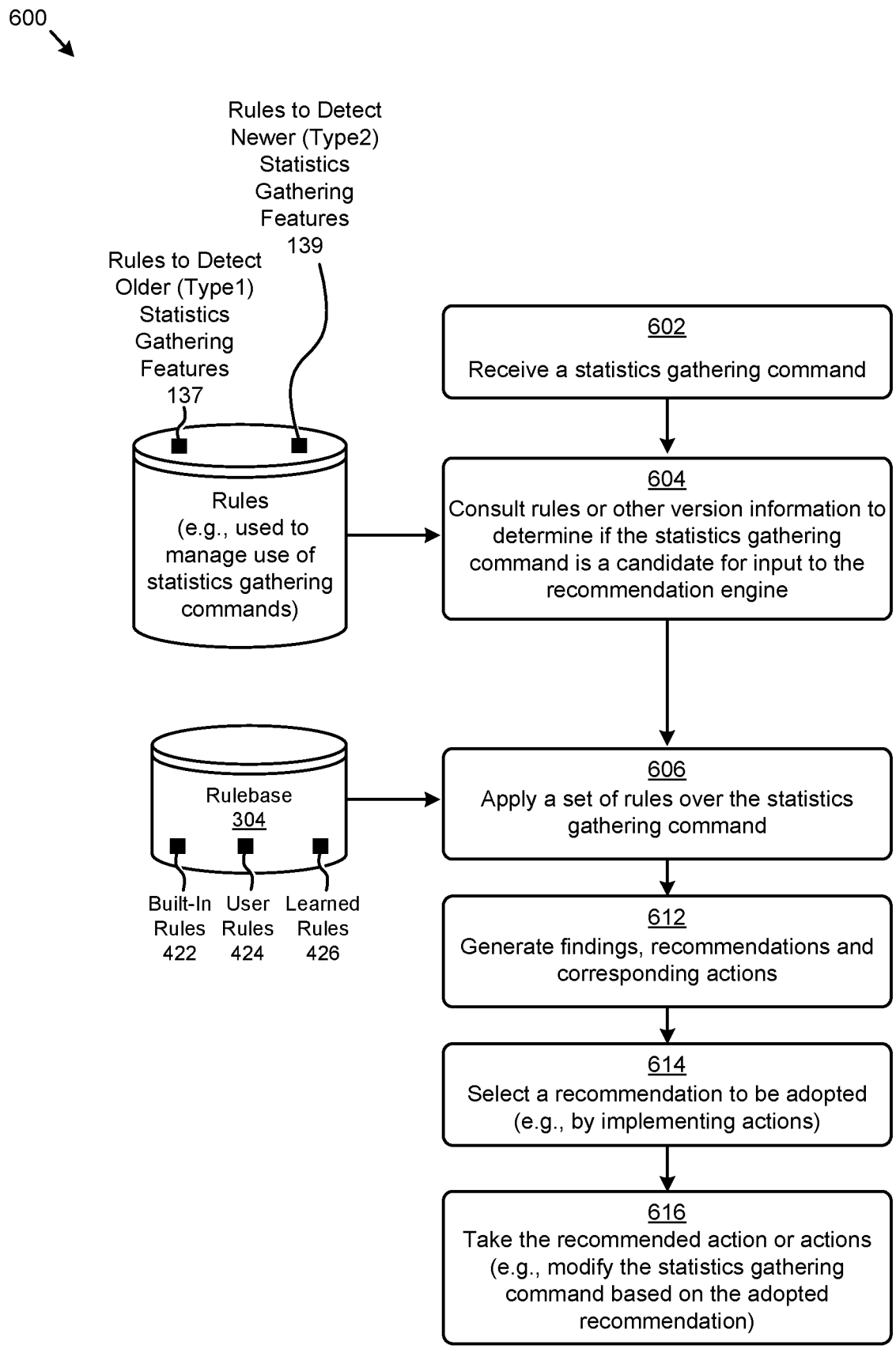
FIG. 6 depicts a statistics gathering statement modification technique used in systems that override of database statistics gathering commands, according to some embodiments.

FIG. 6 depicts a statistics gathering statement modification technique 600 used in systems that override of database statistics gathering commands. As an option, one or more variations of statistics gathering statement modification technique 600 or any aspect thereof may be implemented in the context of the architecture and functionality of the embodiments described herein. The statistics gathering statement modification technique 600 or any aspect thereof may be implemented in any environment.

Strictly as one example a statistics gathering statement modification technique can be implemented as a set of steps. As shown, an initial step to receive a statistics gathering command (at step 602). Processing continues to determine if the statistics gathering command is a candidate for input to the recommendation engine (at step 604). An applicable set of rules are retrieved and applied over the statistics gathering command (at step 606). Further processing serves to generate recommendations and corresponding actions (at step 612). User inputs and/or user rules, and/or user settings can be used to select a recommendation to be adopted, possibly by implementing corresponding actions (at step 614). Adoption of such recommendations can take place in the form of a modification to the statistics gathering command.

In some cases, when a recommendation is selected to be adopted, steps are taken to modify the statistics gathering command based on the adopted recommendation and/or its associated actions (at step 616). In some cases, recommendations can be immediately adopted to a currently intercepted statistics gathering command. In other cases, recommendations and respective actions are captured so as to be applied to statistics gathering commands that are received in a future timeframe. For example, if a software application uses an older statistics gathering command (e.g., "ANALYZE" statement), then a recommendation to use a new style or type (e.g., "dbms_stats") might be emitted. If adopted, the acts of adoption can result in a new rule for improved statistics gathering such that whenever an incoming "ANALYZE" statement is intercepted, the "ANALYZE" statement will superseded by the new "dbms_stats" statistics gathering commands.

The foregoing methods and systems are flexible a pertains to order of execution of operations. Strictly as additional examples, upon receiving a statistics gathering command: (1) rules can be consulted to determine what features or commands are candidates for modification, as well as which findings might be of interest to determine a modification, then (2) after a run, findings (e.g., the findings of interest) are emitted, possibly matched with corresponding recommendations and their actions, then (3) the actions can be taken upon adoption of the recommendation. The actions taken can include a new gathering of statistics (e.g., with new parameters and/or new preferences), and/or storing new settings and/or new preferences that might improve future statistics gathering, etc. As earlier discussed, the adoption of a recommendation and execution of respective actions can occur in a manual mode, or in an automatic mode.

As the database system undergoes ongoing development, new features are added, and new rules are added. The new rules comprise new or updated rules to detect older features as well as new rules to detect newly-released features. Successive releases can include respective updated rule sets. Rule sets can include built-in rules (e.g., pertaining to the newly-released features), as well as user-defined or learned rules (e.g., rules that are brought in from a historical set of user rules).

Figure 7:
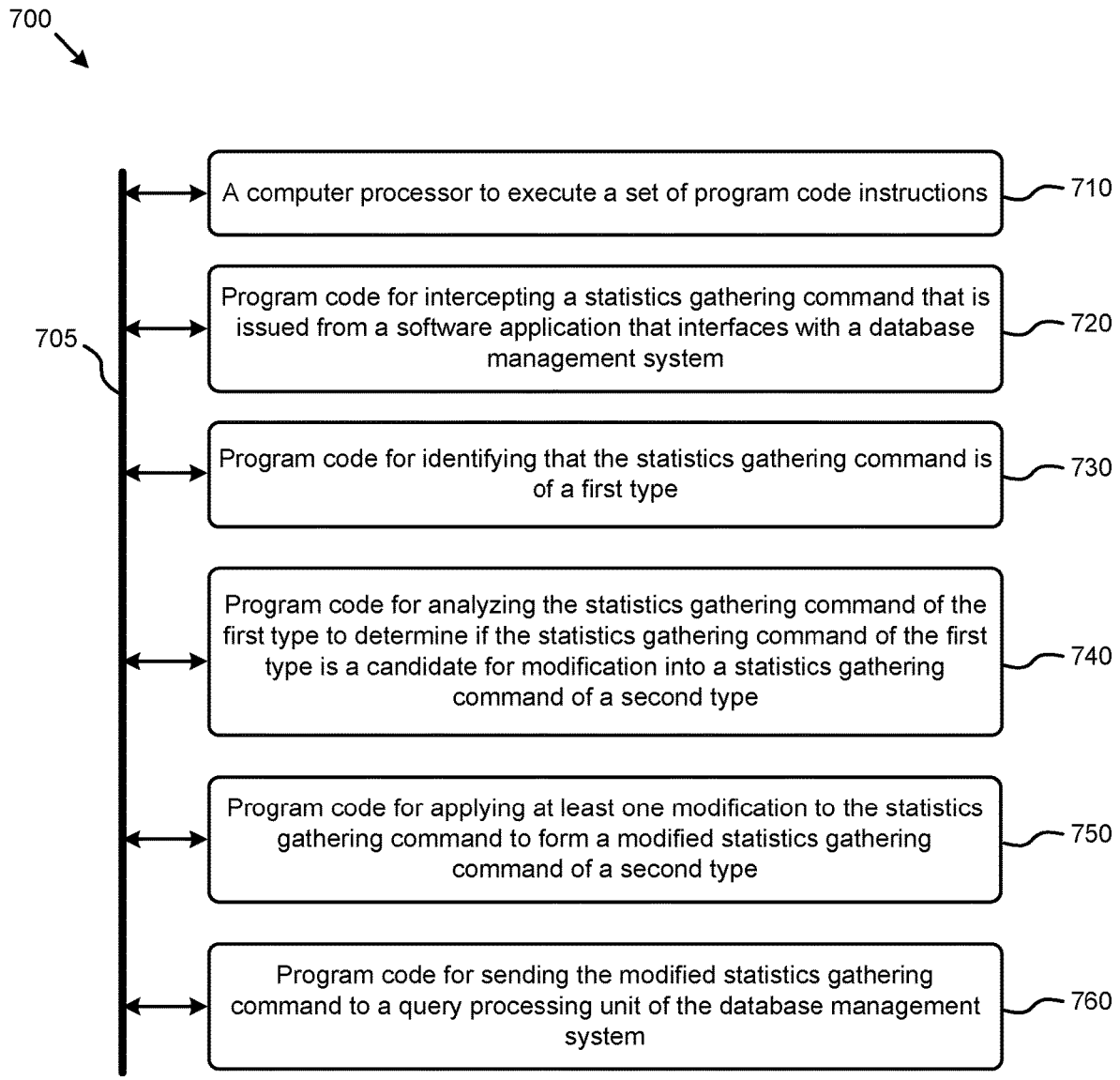
FIG. 7 depicts system components as arrangements of computing modules that are interconnected so as to implement certain of the herein-disclosed embodiments.

Additional Embodiments Of The Disclosure
Additional Practical Application Examples FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (see module 710) and modules for intercepting a statistics gathering command that is issued from a software application that interfaces with a database management system (module 720); identifying that the statistics gathering command is of a first type (module 730); analyzing the statistics gathering command of the first type to determine if the statistics gathering command of the first type is a candidate for modification into a statistics gathering command of a second type (module 740); applying at least one modification to the statistics gathering command to form a modified statistics gathering command of a second type (module 750); and sending the modified statistics gathering command to a query processing unit of the database management system (module 760).

Variations of the foregoing may include more or fewer of the shown modules and variations may perform more or fewer (or different) steps, and/or may use data elements in more, or in fewer or different operations.

Some embodiments include variations that further comprise steps for observing behavior of the database management system after sending the modified statistics gathering command to an execution unit.

Some embodiments include variations where observing behavior comprises at least one of, observing a new run, or observing performance of the new run compared to performance of a previous run.

Some embodiments include variations where observing behavior comprises at least one of, emitting findings, or emitting recommendations, or emitting actions, or any combination thereof.

Some embodiments include variations that include steps for storing, in a learning dataset, at least one of, emitted findings, or emitted actions, or new recommendations, or pending learning data, or any combination thereof.

Some embodiments include variations where the modification candidates comprise at least one of, a feature upgrade, or a parameter override, or a combination thereof.

Some embodiments include variations that further comprise generating a new rule.

Some embodiments include variations that further comprise automatically applying at least one modification candidate based at least in part on the new rule.

Some embodiments include variations that further comprise automatically taking a recommended action based at least in part on the new rule.

Some embodiments include variations that comprise a user interface for selecting a manual mode or an automatic mode.

System Architecture Overview

Additional System Architecture Examples

Figure 8:
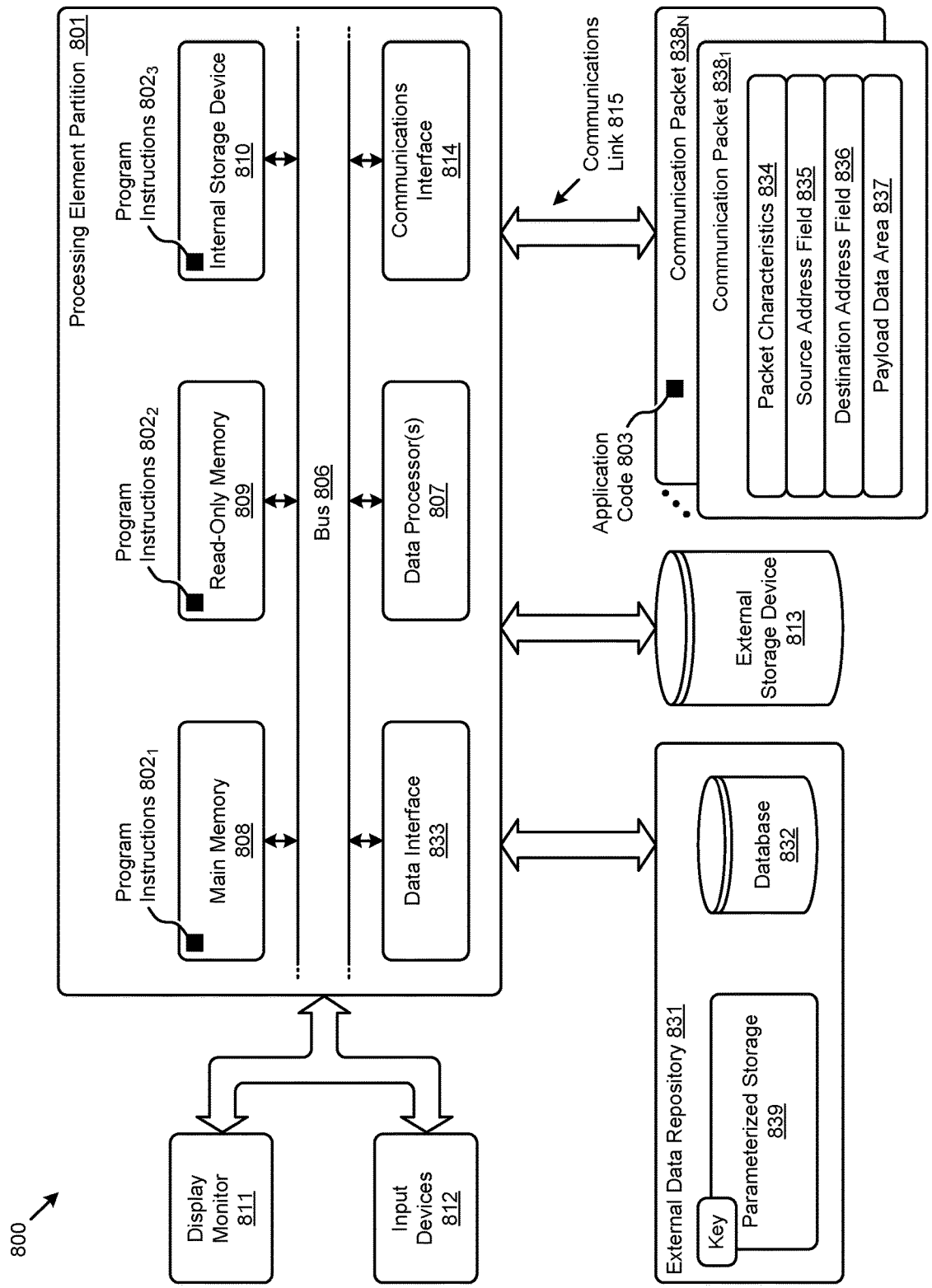
FIG. 8 depicts an exemplary architecture of components suitable for implementing embodiments of the present disclosure and/or for use in the herein-described environments.

FIG. 8 depicts a block diagram of an instance of a computer system 800 suitable for implementing embodiments of the present disclosure. Computer system 800 includes a bus 806 or other communication mechanism for communicating information. The bus interconnects subsystems and devices such as a CPU, or a multi-core CPU (e.g., data processors 807), a system memory (e.g., main memory 808, or an area of random access memory), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 800 further comprises a display 811 (e.g., CRT or LCD), various input devices 812 (e.g., keyboard, cursor control), and an external data repository 831.

According to an embodiment of the disclosure, computer system 800 performs specific operations by data processors 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 800 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access (DMA), etc.) by devices such as data processors 807.

The communications link 815 can be configured to transmit (e.g., send, receive, signal, etc.) any types of communications packets (e.g., communications packet $838_1$, ..., communications packet $838_N$) comprising any organization of data items. The data items can comprise a payload data area 837, a destination address field 836 (e.g., a destination IP address), a source address field 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processors 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 800. According to certain embodiments of the disclosure, two or more instances of computer system 800 coupled by a communications link 815 (e.g., LAN, PTSN, or wireless network) may perform the sequence of instructions required to practice embodiments of the disclosure using two or more instances of components of computer system 800.

The computer system 800 may transmit and receive messages such as data and/or instructions organized into a data structure (e.g., communications packets). The data structure can include program instructions (e.g., application code 803), communicated through communications link 815 and communications interface 814. Received program code may be executed by data processors 807 as it is received and/or stored in the shown storage device, or in or upon any other non-volatile storage for later execution. Computer system 800 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of systems that perform automatic overrides of database statistics gathering commands.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing automatic overrides of database statistics gathering commands). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
   intercepting a first statistics gathering command, wherein
      the first statistics gathering command was coded for a previous version of a database management system, and
      the first statistics gathering command corresponds to a first statistics gathering technique that has existed for the previous version of the database management system;
   determining that a second statistics gathering technique is implemented for an updated version of the database management system, wherein the second statistics gathering technique did not exist in the previous version of the database management system; and
   determining whether the first statistics gathering command is to be supplemented or overridden by a second statistics gathering command, wherein
      the second statistics gathering command corresponds to the second statistics gathering technique that did not exist for the previous version of the database management system.

2. The method of claim 1, further comprising storing a rule that codifies acts of applying a modification to further incoming statistics gathering commands corresponding to the first statistics gathering technique to form modified statistics gathering commands that corresponds to the second statistics gathering technique.

3. The method of claim 2 wherein the rule is a new rule that did not exist at a time of deployment of the first statistics gathering command corresponding to the first statistics gathering technique.

4. The method of claim 1, further comprising observing behavior of the database management system after sending the second statistics gathering command to a query processing unit of the previous version of the database management system.

5. The method of claim 4, wherein observing the behavior comprises at least one of observing a new run, or observing performance of the new run compared to performance of a previous run.

6. The method of claim 4, wherein observing the behavior comprises at least one of emitting findings, emitting recommendations, emitting actions, or any combination thereof.

7. The method of claim 6, further comprising: storing, in a learning dataset, at least one of emitted findings, emitted actions, new recommendations, pending learning data, or any combination thereof.

8. The method of claim 1, wherein the second statistics gathering command obsoletes or deprecates the first statistics gathering command when the second statistics gathering command is determined to improve the first statistics gathering command for the previous version of the database management system.

9. The method of claim 1, further comprising applying at least one modification to the first statistics gathering command to form the second statistics gathering command.

10. The method of claim 9, further comprising receiving a user indication to apply the at least one modification to the first statistics gathering command and applying, responsive to the user indication, the at least one modification to the first statistics gathering command.

11. The method of claim 9, further comprising receiving a user indication of an automatic mode and applying, responsive to the user indication, the at least one modification to the first statistics gathering command.

12. The method of claim 9, further comprising sending the second statistics gathering command to a query processing unit of the previous version of the database management system.

13. The method of claim 1, further comprising consulting a set of rules to detect older statistics gathering commands that correspond to the first statistics gathering command.

14. A non-transitory computer readable medium having stored thereon a sequence of instructions which, when stored in memory and executed by one or more processors, causes the one or more processors to perform a set of acts, the set of acts comprising:
   intercepting a first statistics gathering command, wherein the first statistics gathering command corresponds to a first statistics gathering technique that has existed for a previous version of the database management system;
   determining that a second statistics gathering technique is implemented for an updated version of the database management system, wherein the second statistics gathering technique did not exist in the previous version of the database management system; and
   determining whether the first statistics gathering command is to be supplemented or overridden by a second statistics gathering command, wherein;
      the second statistics gathering command corresponds to the second statistics gathering technique that did not exist for the previous version of the database management system.

15. The non-transitory computer readable medium of claim 14, further comprising instructions which, when stored in the memory and executed by the one or more processors, cause the one or more processors to perform an act of applying a rule that to perform an act of applying a modification to one or more statistics gathering commands corresponding to the first statistics gathering technique to form modified statistics gathering commands corresponding to the second statistics gathering technique.

16. The non-transitory computer readable medium of claim 15, wherein the rule is a new rule that did not exist at a time of deployment of the first statistics gathering command for the previous version of the database management system.

17. The non-transitory computer readable medium of claim 14, further comprising instructions which, when stored in the memory and executed by the one or more processors, causes the one or more processors to perform an act of observing behavior of the database management system after sending the second statistics gathering command to a query processing unit of the previous version of the database management system.

18. The non-transitory computer readable medium of claim 17, wherein observing the behavior comprises at least one of observing a new run or observing performance of the new run compared to performance of a previous run.

19. A system comprising:
   a non-transitory storage medium having stored thereon a sequence of instructions; and
   one or more processors that execute the sequence of instructions, wherein an execution of the sequence of instructions causes the one or more processors to perform a set of acts, the set of acts comprising:
      intercepting a first statistics gathering command, wherein the first statistics gathering command corresponds to a first statistics gathering technique that has existed for a previous version of the database management system;
      determining that a second statistics gathering technique is implemented for an updated version of the database management system, wherein the second statistics gathering technique did not exist in the previous version of the database management system; and
      determining whether the first statistics gathering command is to be supplemented or overridden by a second statistics gathering command, wherein;
         the second statistics gathering command corresponds to the second statistics gathering technique that did not exist for the previous version of the database management system.

20. The system of claim 19 wherein the second statistics gathering command obsoletes or deprecates the first statistics gathering command when the second statistics gathering command is determined to improve the first statistics gathering command for the previous version of the database management system.

* * * * *